United States Patent [19]

Osawa et al.

[11] Patent Number: 5,287,737

[45] Date of Patent: Feb. 22, 1994

[54] DEVICE FOR DETERMINING MISFIRING OF A CYLINDER OF A MULTICYLINDER ENGINE

[75] Inventors: Kouichi Osawa, Susono; Hideki Morishima, Anjo, both of Japan

[73] Assignees: Toyota Jidosha Kabushiki Kaisha, Toyota; Nippondenso Co., Ltd., Kariya, both of Japan

[21] Appl. No.: 914,833

[22] Filed: Jul. 16, 1992

[30] Foreign Application Priority Data

Jul. 19, 1991 [JP] Japan ................... 3-179603

[51] Int. Cl.⁵ ........................................... G01M 15/00
[52] U.S. Cl. ................................................. 73/117.3
[58] Field of Search .......................... 73/117.3, 35; 364/431.07, 431.08; 340/439; 123/419, 479, 436

[56] References Cited

U.S. PATENT DOCUMENTS

| | | | |
|---|---|---|---|
| 4,268,910 | 5/1981 | Omori et al. | 364/431.08 |
| 4,383,440 | 5/1983 | Murata | 73/117.3 |
| 4,930,479 | 6/1990 | Osawa et al. | 123/436 |
| 5,021,960 | 6/1991 | Manaka et al. | 123/436 |
| 5,044,195 | 9/1991 | James et al. | 73/117.3 |
| 5,144,927 | 9/1992 | Denz | 123/425 |

FOREIGN PATENT DOCUMENTS 62-22829 10/1987 Japan.
2-49955 2/1990 Japan.
2-161172 6/1990 Japan.

Primary Examiner—Robert Raevis
Attorney, Agent, or Firm—Kenyon & Kenyon

[57] ABSTRACT

The device for determining a misfiring of a cylinder of a multicylinder engine determines that a misfire has occurred when a change in the angular velocity of the crank shaft detected by a crank angle sensor mounted to the engine body becomes larger than a predetermined set value, and to prevent a misjudgement caused by engine vibration, the device changes the mode of operation for determining the misfire when the engine is operated in a region in which the engine vibration is increased, i.e., in this operating region, the determination of the misfire is not carried out, or the above predetermined set value for the change in angular velocity is increased.

3 Claims, 13 Drawing Sheets

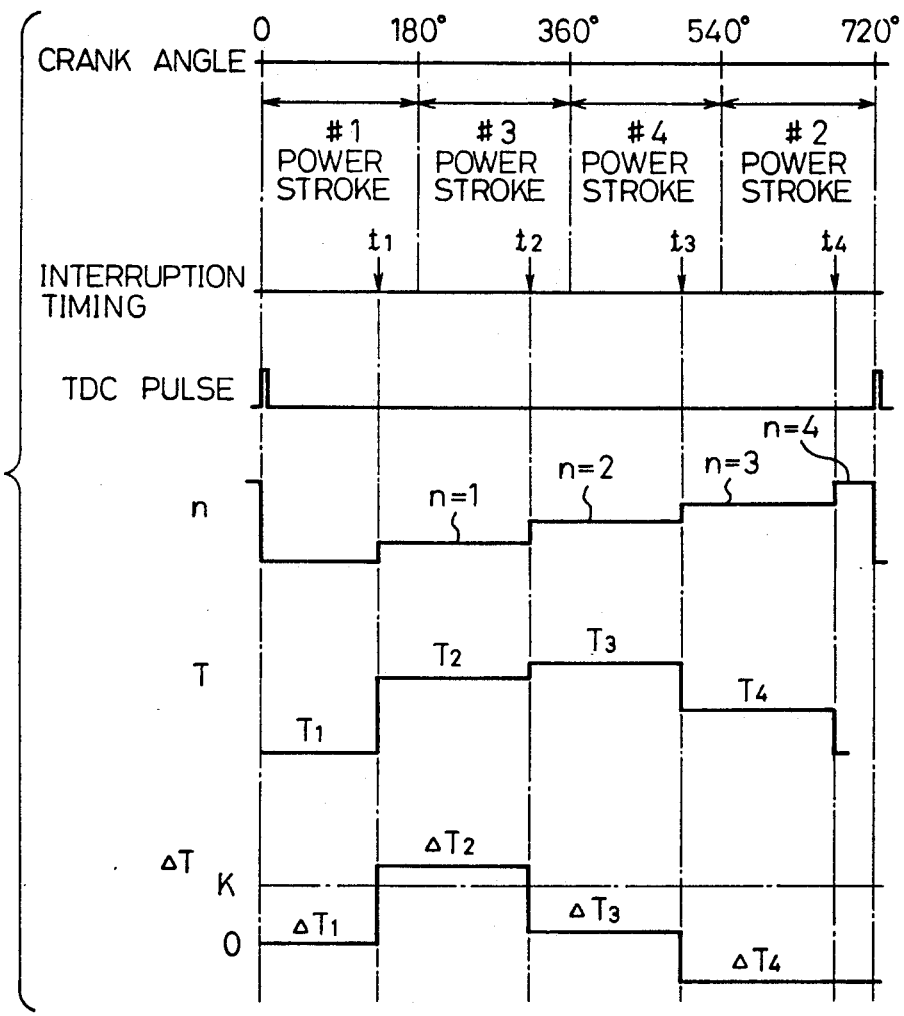

DEVICE FOR DETERMINING MISFIRING OF A CYLINDER OF A MULTICYLINDER ENGINE

BACKGROUND OF THE INVENTION

1. Field of the Invention

The present invention relates to a device for determining a misfiring in one cylinder of a multicylinder engine.

2. Description of the Related Art

When a misfire occurs in one of the cylinders in a multicylinder engine, the engine rotational speed drops at the power stroke in which the misfire occurs, and therefore, the time required for the crankshaft to turn by a certain crank angle during the power stroke of the misfiring cylinder becomes longer than that of other cylinders.

Therefore, for example, there is known a multicylinder engine where it is determined, for example, that the No. 1 cylinder has misfired when the period required for the crankshaft to turn by a certain crank angle during the power stroke of the No. 1 cylinder becomes longer than that of other cylinders (see Japanese Unexamined Patent Publication (Kokai) No. 62-228929).

Such a multicylinder engine is provided with a rotor which is made to rotate synchronously with the crankshaft, and which is provided with outer teeth, and an electromagnetic pickup is disposed on the engine body in the proximity of the outer teeth of the rotor, to produce an output pulse when facing an outer tooth. The time required for the crankshaft to turn by a certain crank angle is determined from the time interval of the generation of these output pulses.

The engine body, however, is usually supported by the vehicle body via engine mounts made of a resilient material such as a rubber, and thus the engine body vibrates in all directions during the operation thereof. Namely, during the operation of the engine, an engine vibration component exists along the direction of the rotation of the crankshaft, and accordingly, the relative speed of rotation of the engine body and the crankshaft includes an oscillating component generated by the engine vibration. Therefore, if the magnetic pickup is disposed on the engine body, as mentioned above, the time required for the crankshaft to turn by a certain crank angle becomes different from an actual time, when the engine vibration becomes high.

The operating speed of the engine in which the vibration of the engine is increased by resonance is determined by the spring constant (i.e., the rigidity) of the engine mounts. Usually, the rigidity of the engine mount is selected such that resonance occurs only when the engine speed is lower than the normal operating range (i.e., lower than an idling speed of the engine) to maintain the engine vibration at a relatively low level in the normal operating range. Nevertheless, the rigidity of the engine mount is gradually increased as the operation period of the engine is extended, because the material of the engine mounts tends to harden with an elapse of time. Therefore, after the engine is used for a long time, the operating speed at which the engine resonates is also gradually increased, and the vibration of the engine becomes high even in the normal operating speed range.

As mentioned above, this causes a variation of the time required for the crankshaft to turn by a certain crank angle, which is detected by the magnetic pickup disposed on the engine body, even when no misfire occurs. Therefore, it may be incorrectly determined that a misfire has occurred, even though such a misfire has not actually occurred.

SUMMARY OF THE INVENTION

In view of the problems of the related art, the object of the present invention is to provide a device for detecting a misfire in one cylinder of a multicylinder engine, by which an erroneous detection due to an increased engine vibration is avoided.

According to the present invention, there is provided a device for determining a misfire in one cylinder of a multicylinder engine having a crankshaft rotatably supported by the engine body, comprising a velocity detecting means for detecting angular velocities of the crankshaft rotation relative to the engine body during power stroke periods of the respective cylinders; a difference calculating means for calculating differences of the angular velocities during the power stroke periods of two respective cylinders successively in the firing order; a misfire determining means for determining that a misfire has occurred when said difference of the angular velocities becomes larger than a predetermined set value; an operating condition detecting means for detecting the operating conditions of the engine; and, a control means for controlling the operation of said misfire detecting means when the engine operating condition coincides with a predetermined condition in which the vibration of the engine is increased.

BRIEF DESCRIPTION OF THE DRAWINGS

The present invention will be better understood from the description as set forth hereafter, with reference to the accompanying drawings, in which:

FIG. 5 (B) is a graph showing the set value K as a function of N;

FIG. 5 (C) shows a map for the value K as a function of Q/N and N;

FIG. 8 (B) is a graph showing the set value K as a function of N while keeping the engine operating load Q/N constant;

FIG. 8 (C) shows a map for the value K as a function of Q/N and N;

FIG. 9 is a time chart showing the determination of a misfire in this embodiment according to the present invention;

DESCRIPTION OF THE PREFERRED EMBODIMENTS

Figure 1:
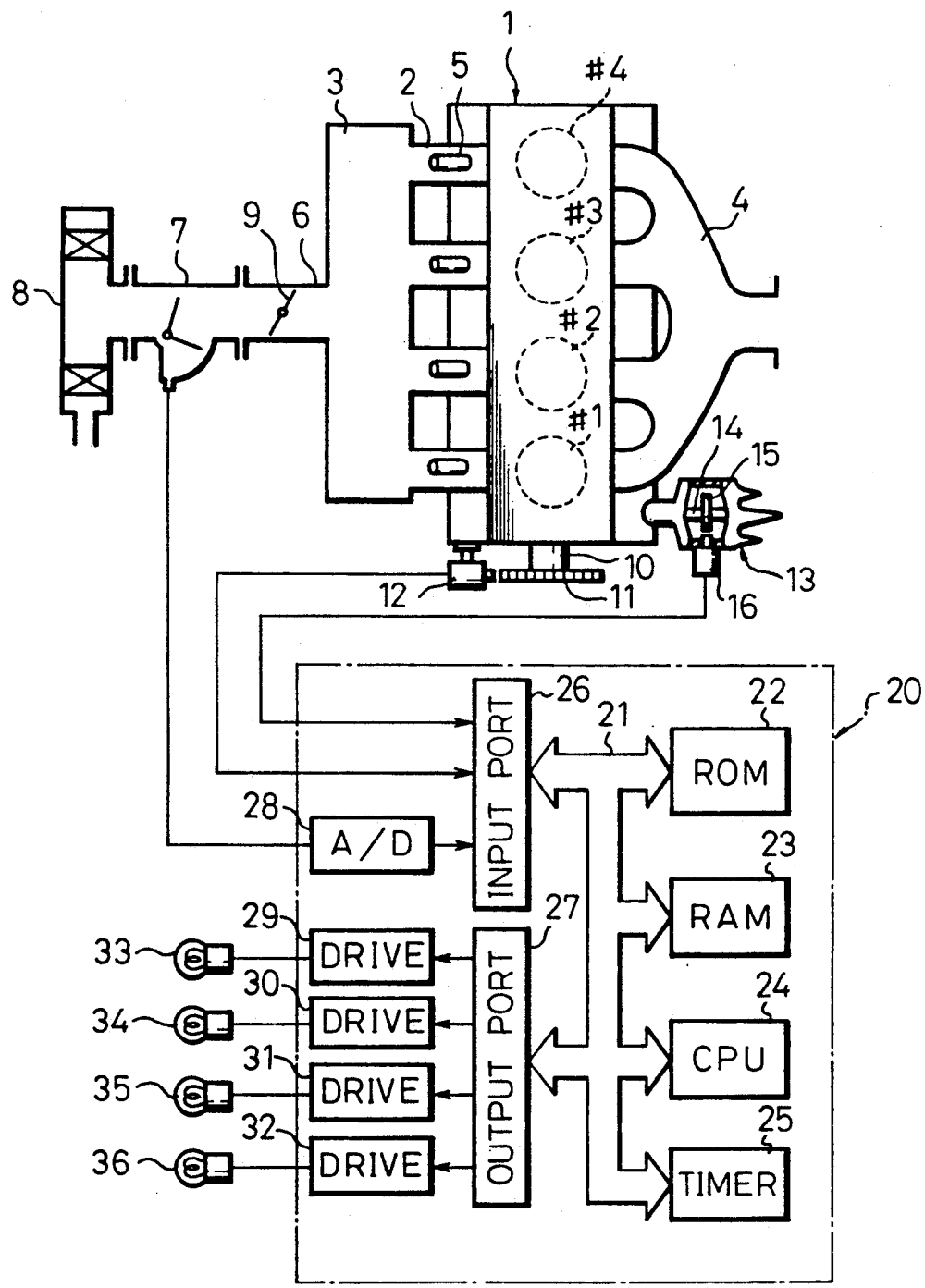
FIG. 1 is an overall view of an internal combustion engine.

Referring to FIG. 1, the internal combustion engine 1 is provided with four cylinders: the No. 1 cylinder #1, No. 2 cylinder #2, No. 3 cylinder #3, and No. 4 cylinder #4. The cylinders are connected to an inlet air surge tank 3 through corresponding branching pipes 2 and on the other hand are connected to an exhaust manifold 4. In each of the branching pipes 2 is mounted a fuel injector 5. The surge tank 3 is connected to an air cleaner 8 through a suction duct 6 and an air flow meter 7. In the suction duct 6 is disposed a throttle valve 9. On the other hand, the crankshaft 10 of the internal combustion engine 1 has mounted thereto a disc-shaped rotor 11. At the outer circumference of the rotor 11, in an opposing manner thereto, a crank angle sensor 12 is mounted to the engine.

The internal combustion engine 1 also has mounted to it a distributor 13, which distributor 13 is provided with a shaft 14 which turns at a speed one-half that of the crankshaft 14. The shaft 14 has affixed to it a disc-shaped rotor 15. At the outer circumference of the rotor 15 is disposed a TDC sensor 16 in an opposing manner. The crank angle sensor 12 and the TDC sensor 16 are connected to an electronic control unit 20.

The electronic control unit 20 is comprised of a digital computer and includes a ROM (read only memory) 22, a RAM (random access memory) 23, a CPU (microprocessor) 24, a timer 25, an input port 26, and an output port 27, all mutually connected through a two-way bus 21. The timer 25 is comprised of a free running counter which performs a count-up function when power is supplied to the electronic control unit 20, therefore the count of the free running counter shows the time. The air flow meter 7 generates an output voltage signal proportional to the amount of intake air. The output voltage of the same is input to the input port 26 through an AD converter 28. Further, the output signals of the crank angle sensor 12 and the TDC sensor 16 are input to the input port 26. On the other hand, the output port 27 is connected through corresponding drive circuits 29, 30, 31, and 32 to an alarm lamp 33 showing that the No. 1 cylinder #1 has misfired, an alarm lamp 34 showing that the No. 2 cylinder #2 has misfired, an alarm lamp 35 showing that the No. 3 cylinder #3 has misfired, and an alarm lamp 36 showing that the No. 4 cylinder #4 has misfired.

Figure 2:
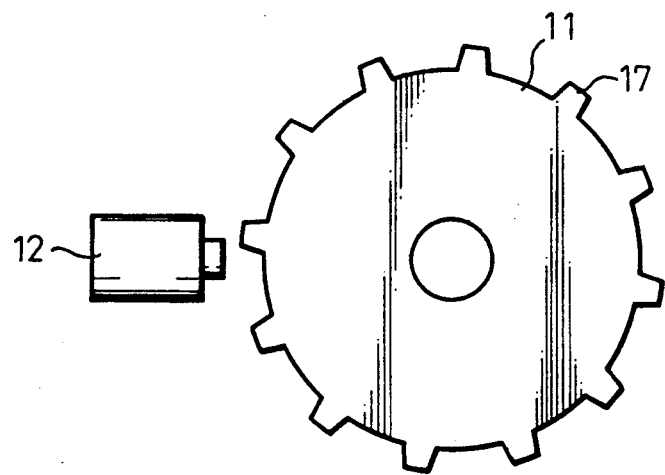
FIG. 2 is a front view of a rotor.

FIG. 2 shows the rotor 11 and the crank angle sensor 12. In the embodiment shown in FIG. 2, the rotor 11 has twelve outer teeth 17 formed equiangularly every 30 degrees. The crank angle sensor 12 is comprised of an electromagnetic pickup which issues an output pulse when facing the outer teeth 17. Therefore, in the embodiment shown in FIG. 2, when the crankshaft 10 (FIG. 1) turns, that is, when the rotor 11 turns, the crank angle sensor 12 issues an output pulse each time the crankshaft 10 turns 30 degrees and the output pulse is input to the input port 26 (FIG. 1).

Figure 3:
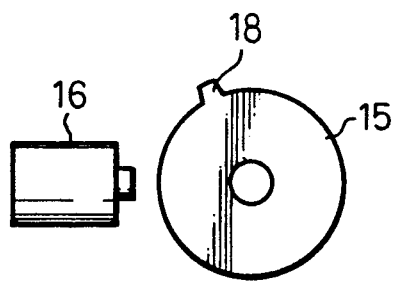
FIG. 3 is a front view of a rotor.

On the other hand, FIG. 3 shows the rotor 15 and the TDC sensor 16. In the embodiment shown in FIG. 3, the rotor 15 has a single projection 18, while the TDC sensor 16 is comprised of an electromagnetic pickup which issues an output pulse when facing the projection 18. As mentioned before, the rotor 15 is turned at a rotational speed one-half that of the crankshaft 10 (FIG. 1). Therefore, when the crankshaft 10 turns, the TDC sensor 16 issues an output pulse every time the crankshaft 10 turns 720 degrees and this output pulse is input to the input port 26 (FIG. 1). The projection 18 is arranged in position so as to face the TDC sensor 16 when, for example, the No. 1 cylinder #1 reaches the TDC of its power stroke. Therefore, the TDC sensor 16 issues the output pulse when the No. 1 cylinder #1 reaches the TDC of the power stroke.

The CPU 24 calculates the current crank angle from the output pulses of the TDC sensor 16 and the crank angle sensor 12. Further, the CPU 24 calculates the revolution speed of the engine from the output pulse of the crank angle sensor 12.

When a misfire occurs in any one of the cylinders, the rotational speed of the engine falls during the power stroke of the misfiring cylinder; i.e., the angular velocity of the crankshaft 10 becomes smaller and the time required for completing the power stroke increases in inverse proportion to the angular velocity of the crankshaft 10.

For example, in a four cycle engine as shown in FIG. 1, the power stroke is repeated every 180 degrees crank angle (CA), and therefore, the time required for the power stroke of each cylinder can be detected by counting the time required for the crankshaft 10 to rotate every 180 degrees CA.

Figure 4:
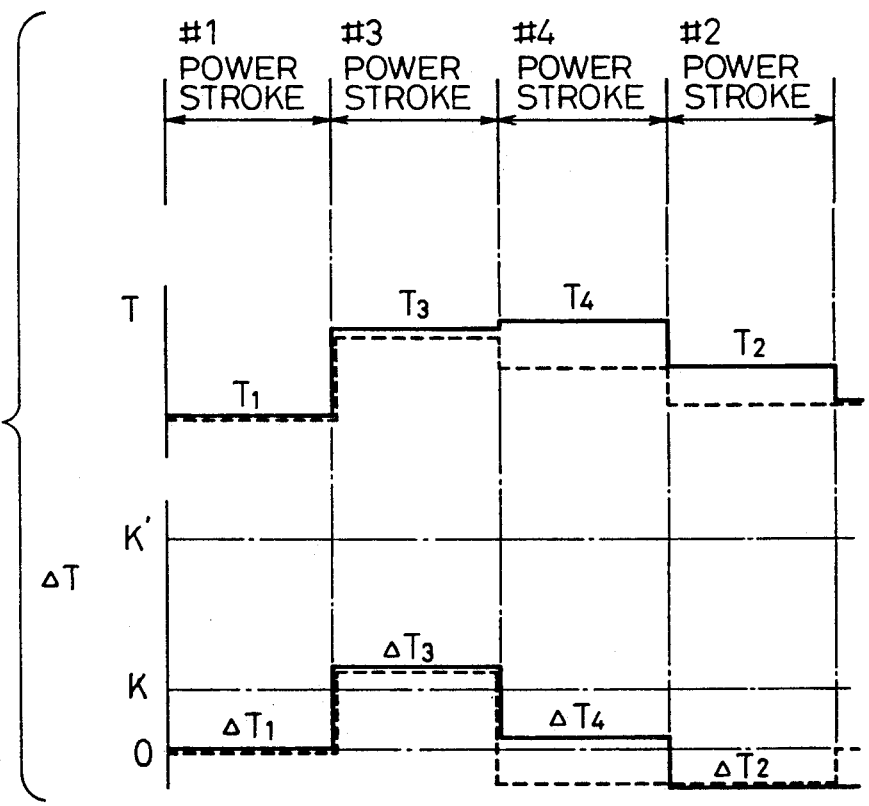
FIG. 4 is a time chart showing the change in the angular velocity of the crankshaft rotation when a misfire occurs.

FIG. 4 shows the time required for the power stroke of each cylinder. The figure is drawn on the basis of a four cycle engine having a firing order of 1-3-4-2. In FIG. 4, $T_1$ represents a time required for the power stroke of the No. 1 cylinder (#1), and $T_2$, $T_3$ and $T_4$ represent same for No. 2 (#2), No. 3 (#3) and No. 4 (#4) cylinders, respectively. In FIG. 4, the misfire occurs in #3 cylinder and the time $T_3$ required for the power stroke is increased as indicated by a solid line. In this case, also the time $T_4$ for #4 cylinder is increased to the same level as #3 cylinder, and then the time required for the power strokes is gradually decreased.

Further $\Delta T$ in FIG. 4, shows differences between the time required for the power strokes of two cylinders in a successive firing order. When the misfire occurs, the difference $\Delta T$ is increased only for the misfiring cylinder. For example, as shown in FIG. 4, the difference $\Delta T_3$ for misfiring #3 cylinder (which is equal to $T_3 - T_1$) is increased by a large amount. Therefore, the misfiring cylinder can be identified by the value of $\Delta T$ for each cylinder. In this embodiment, when the difference $\Delta T$ for a cylinder becomes larger than a predetermined value K, it is determined that the misfire has occurred in that cylinder.

The magnitude of the difference $\Delta T$ also varies according to the engine revolution speed N and the engine operating load (in this embodiment, the engine operation load is defined by Q/N, which represents a volume of inlet air flow Q per one revolution of the engine). Therefore, the above predetermined set value K is also changed according to the engine revolution speed N and the engine operating load Q/N.

Figure 5A:
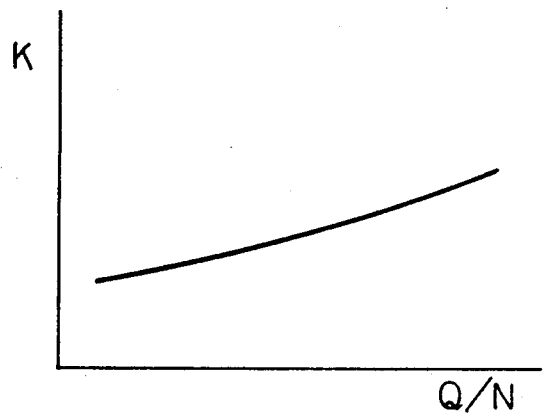
FIG. 5 (A) is a graph showing the set value K as a function of Q/N.
Figure 5B:
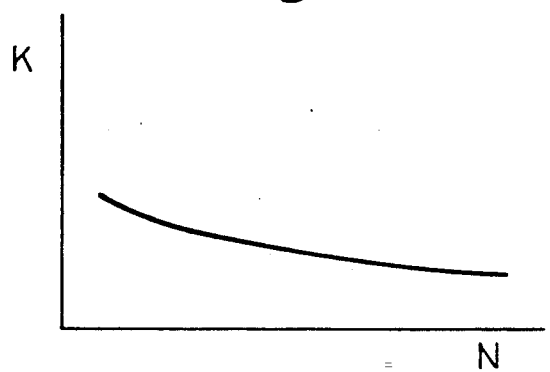
Figure 5C:
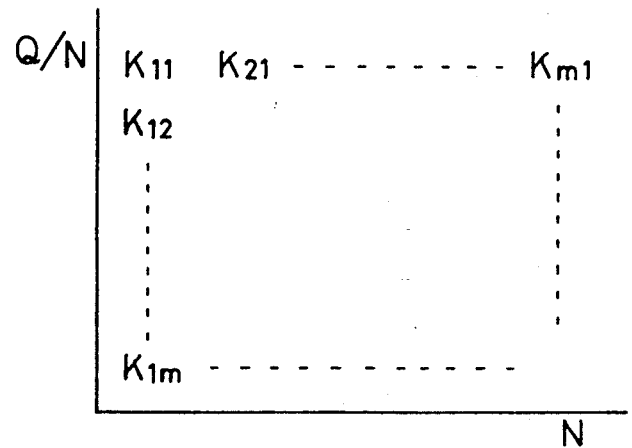

FIG. 5 (A), (B) shows the relationships between the values K and (Q/N) and K and N respectively. When the engine operating load (Q/N) is high, the revolution speed of the engine falls largely if a misfire occurs, and therefore, $\Delta T$ becomes larger when the misfire occurs under a high operating load. On the other hand, when the revolution speed N of the engine is high, the time required for the power stroke of each cylinder becomes shorter, and therefore, the difference $\Delta T$ also becomes smaller.

Therefore, as shown in FIG. 5 (A), the set value K is increased as the operating load (Q/N) becomes higher, and as shown in FIG. 5 (B), the set value K is decreased as the revolution speed N becomes lower. In this embodiment, the set value K is stored in advance in the ROM 22 of the engine control unit 20, in the form of a map as a function of (Q/N) and N as shown in FIG. 5, and when the difference $\Delta T$ of a cylinder becomes larger than the set value in FIG. 5 (C), it is determined that said cylinder is misfiring.

As explained before, however, if the engine 1 violently vibrates around the crankshaft 10, the relative rotating speed between the crank angle sensor 12 (which is mounted to the engine) and the rotor 11 (which is mounted to the crankshaft 10) fluctuates. In this case, the time T calculated from the output pulse of the crank angle sensor 12 also varies largely, and consequently, the difference $\Delta T$ thereof is also increased largely. The variation of the time T and the difference $\Delta T$ due to the engine vibration is indicated by a dotted line in FIG. 4. In FIG. 4, the time $T_3$ calculated from the output pulse of the crank angle sensor 12 is increased largely by the engine vibration, and the difference $\Delta T_3$ becomes larger than the set value K. Thus an erroneous judgement is made that the misfire is occurring in #3 cylinder even though no misfire is actually occurring.

To prevent such a misjudgement, either of two types of countermeasure can be adopted according to the present invention.

The first type of countermeasure for preventing the misjudgement is to prohibit the determination of the misfire when the engine 1 vibrates violently.

Figure 6:
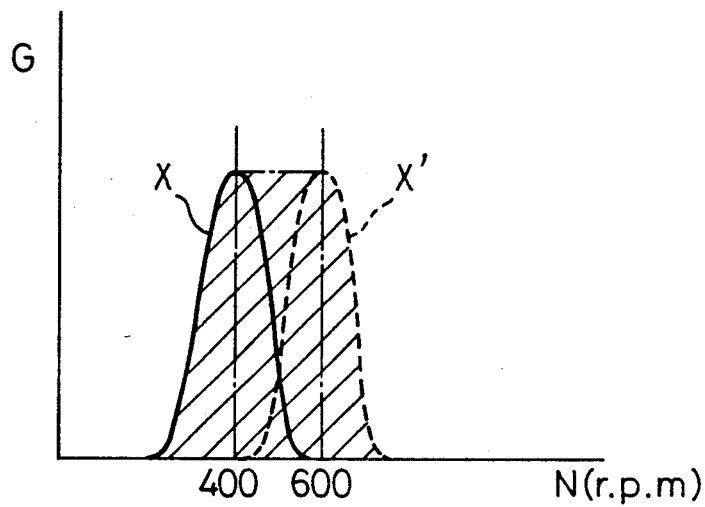
FIG. 6 is a graph showing the relationships between the magnitude of the engine vibration and the engine speed.
Figure 7:
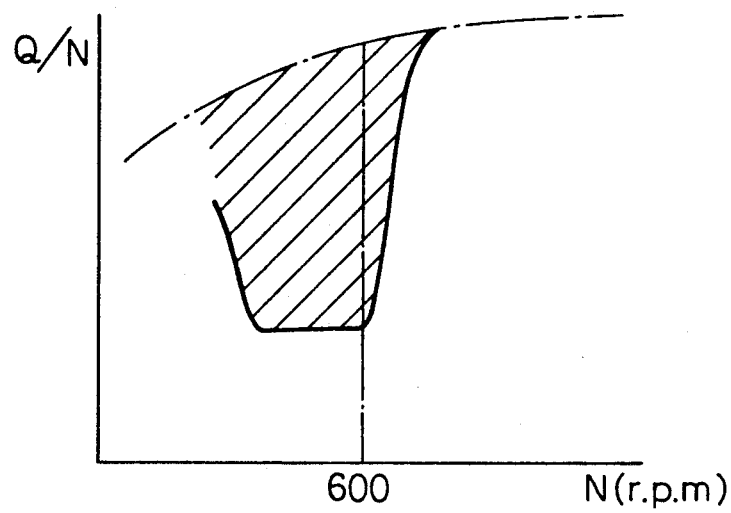
FIG. 7 is a graph showing the operating conditions of the engine in which the vibration of the engine is increased.

As explained before, the engine revolution speed range in which the engine vibration increases due to resonance depends on the rigidity of the engine mounts. Usually, the rigidity of the engine mounts is selected so that the resonance occurs at a speed lower than the idling speed. Nevertheless, after the engine is used for a long time, the resonance speed becomes higher due to a hardening of the engine mount material. FIG. 6 shows the change in the distribution of the vibration intensity G of the engine. When the engine is new, the distribution of the vibration intensity G is represented by the curve X in FIG. 6. As shown by the curve X, the vibration increases in the narrow speed range centered on the resonance speed (i.e., in FIG. 6, 400 rpm). After the engine is operated for a long time, the distribution of the vibration shifts to a higher speed region (as shown by the curve X' in FIG. 6) due to the hardening of the engine mount. Therefore, considering the secular change, a large vibration may occur in the speed range indicated by a hatched line in FIG. 6. Further, in the speed range in FIG. 6, the vibration is further increased as the engine operating load (Q/N) is increased. Although the set value K is increased as (Q/N) becomes higher as shown in FIG. 5 (A), when (Q/N) is increased in the speed range shown in FIG. 6, the difference $\Delta T$ may become larger than the set value K, due to large engine vibration. Therefore, to prevent the misjudgement, it is necessary to prohibit the determination of a misfire when the engine is operated in a speed range shown in FIG. 6 and at more than a certain operating load. The hatched area in FIG. 7 represents the operating range defined by the engine speed N and operating load (Q/N) in which the determination of the misfire should be prohibited to avoid a misjudgement. In the embodiment incorporating the first type of countermeasure, the operating range shown by the hatched area in FIG. 7 is stored in advance in the ROM 22 in the form of a map, as a function of the engine speed N and the engine operating load (Q/N).

Figure 8A:
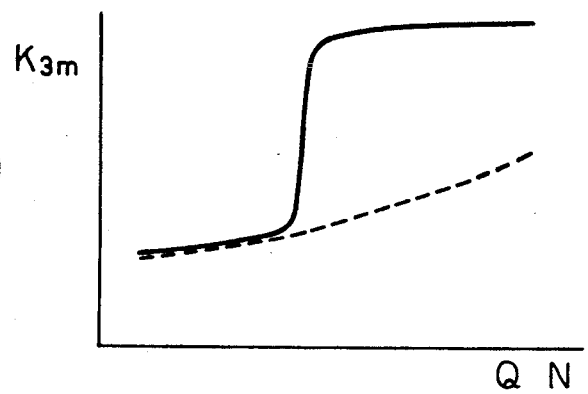
FIG. 8 (A) is a graph showing the set value K as a function of Q/N while keeping the engine speed N constant.
Figure 8B:
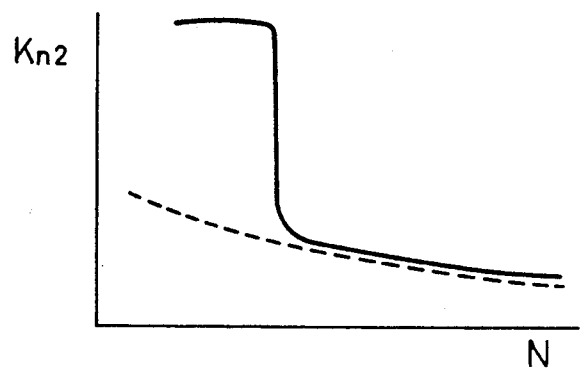
Figure 8C:
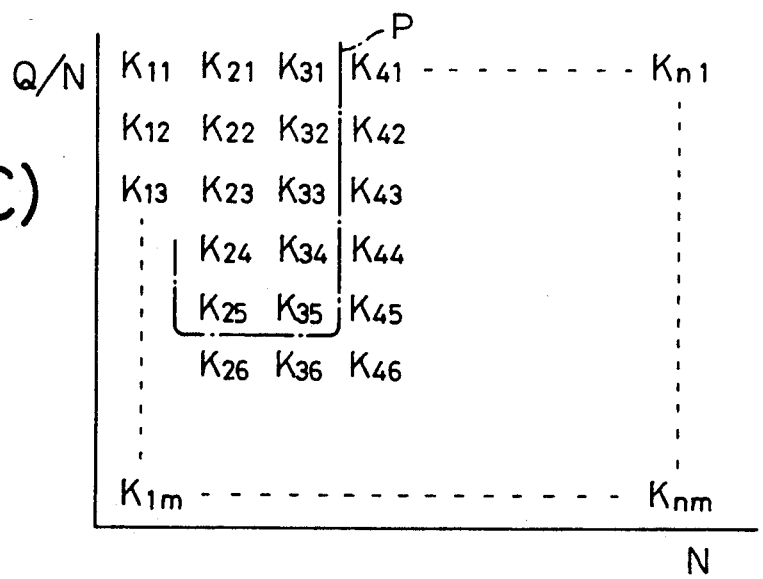

The second type of countermeasure for preventing the misjudgement is to increase the set value K (e.g., to the value K' shown in FIG. 4) when the engine is operated in the operating range shown by hatched area in FIG. 7. FIG. 8 (C) represents a map for the set value K, which is similar to FIG. 5 (C) but incorporates the above countermeasure. In FIG. 8 (C), the area surrounded by the chain line "P" corresponds to the operating range shown by hatched area in FIG. 7. The set values $K_{21} \sim K_{25}$, $K_{31} \sim K_{35}$ in the area surrounded by the line P are set larger than the set values outside of this area. For example, FIG. 8 (A) shows a change in the set value $K_{3m}$ (m=1, 2, ..., m), i.e., a change of the set value K in accordance with the engine operating load (Q/N) while keeping the engine speed N constant. Also, FIG. 8 (B) shows a change in the set value $K_{n2}$ (n=1, 2, ..., n), i.e., a change of the set value K in accordance with the engine revolution speed N while keeping the engine operating load (Q/N) constant. In FIGS. 8 (A) and 8 (B), the dotted lines represent the setting values in FIGS. 5 (A) and 5 (B), i.e., the values without an incorporation of the above countermeasure. In the embodiment of the present invention incorporating the second type of countermeasure, the setting values $K_{nm}$ (n=1 2, ... n, m=1, 2, ... m) shown in FIG. 8 (C) are stored in the ROM 22 of the engine control unit 20 in the form of a map, as a function of (Q/N) and N.

Figure 10:
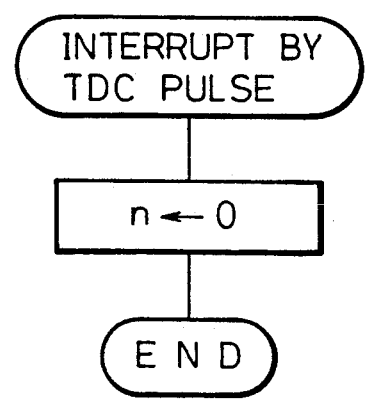
FIG. 10 is a flow chart of a routine executed by an interruption by a top dead center pulse signal.

FIG. 9 shows a time chart representing an embodiment of the misfire determining process shown in FIG. 4. In FIG. 9, the crank angle is expressed based on the TDC of the power stroke of the #1 cylinder. As explained before, when the #1 cylinder reaches the TDC of the power stroke thereof, the TDC sensor 16 generates a TDC pulse as shown in FIG. 9. When this TDC pulse is generated, the interruption routine shown in FIG. 10 is executed to thereby reset the counter n. (n=0).

On the other hand, when the TDC of the power strokes of the cylinders are slightly exceeded, as shown by $t_1$, $t_2$, $t_3$, and $t_4$ in FIG. 9, the interruption routine is executed at every 180 degrees CA. When the interruption routine is executed, the count n of the counter is incremented by "1" and simultaneously the times $T_1$, $T_2$, $T_3$, and $T_4$ elapsed from the former interruption to the current interruption are calculated. That is, during the interruption shown by $t_1$, the elapsed time $T_1$ in the cylinder #1 is calculated, during the interruption shown by $t_2$, the elapsed time $T_2$ in the cylinder #3 is calculated, during the interruption shown by $t_3$, the elapsed time $T_3$ in the cylinder #4 is calculated, and during the interruption shown by $t_4$, the elapsed time $T_4$ in the cylinder #2 is calculated. Further, the difference $\Delta T$ of the elapsed time T is also calculated at each interruption. That is, during the interruption shown by $t_1$, the difference $\Delta T_1$ (=$T_1-T_4$) is calculated. Similarly the differences $\Delta T_2$ (=$T_2-T_1$), $\Delta T_3$ (=$T_3-T_2$) and $\Delta T_4$ (=$T_4-T_3$) are calculated during the interruptions shown by $t_2$, $t_3$ and $t_4$ respectively. Note that the subscripts of ΔT in FIG. 9 do not coincide with the cylinder numbers of the engine.

In the first embodiment of the present invention incorporating the first type of countermeasure, it is determined during each interruption whether or not the operating condition of the engine is inside the hatched area in FIG. 7. Then, it is determined whether or not the ΔT is larger than the value K only when the operating condition is not inside said area, and it is judged that a misfire has occurred in the cylinder in which the ΔT is larger than the value K.

On the other hand, in the second embodiment of the present invention, which incorporates the second type of countermeasure, it is determined during each interruption whether or not the ΔT is larger than the value K, and if the ΔT is larger than the value K in any one of the cylinders, this cylinder is judged to be misfiring.

Figure 11:
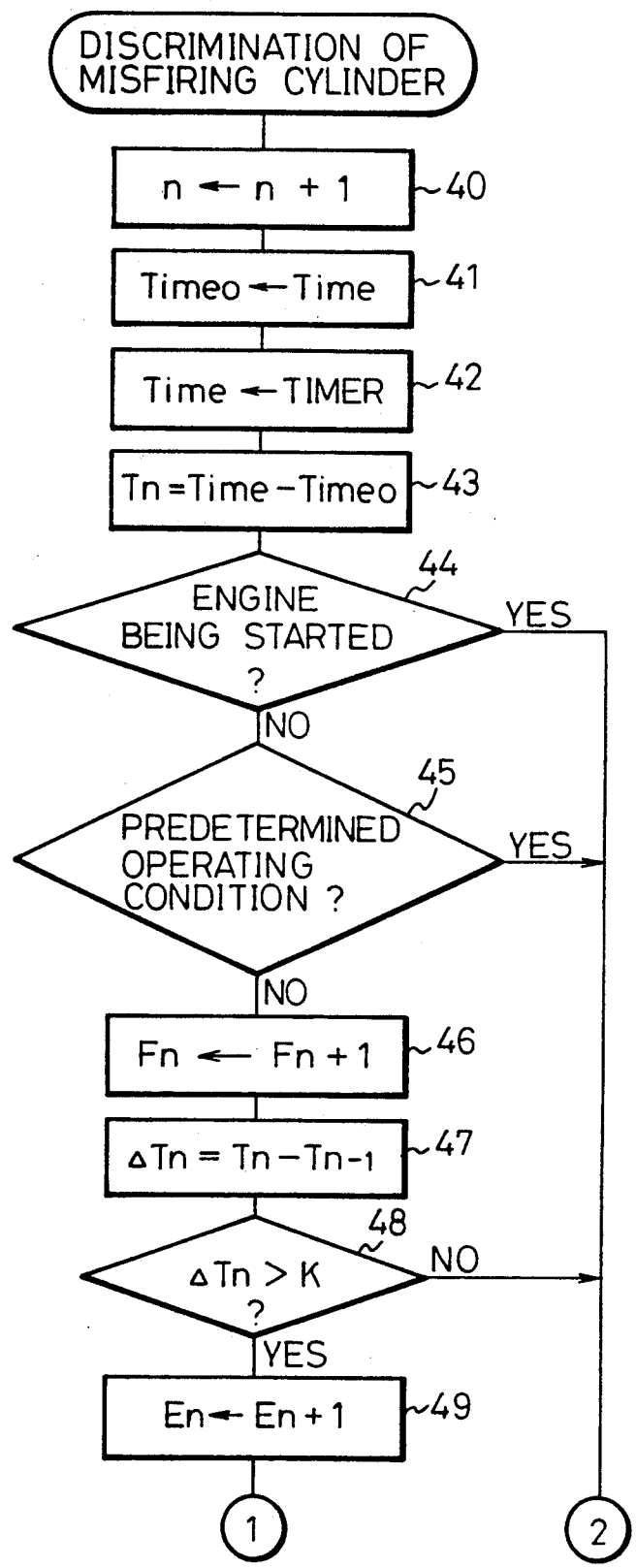
FIGS. 11 and 12 show a flow chart of the misfire determining operation of an embodiment of the present invention.
Figure 12:
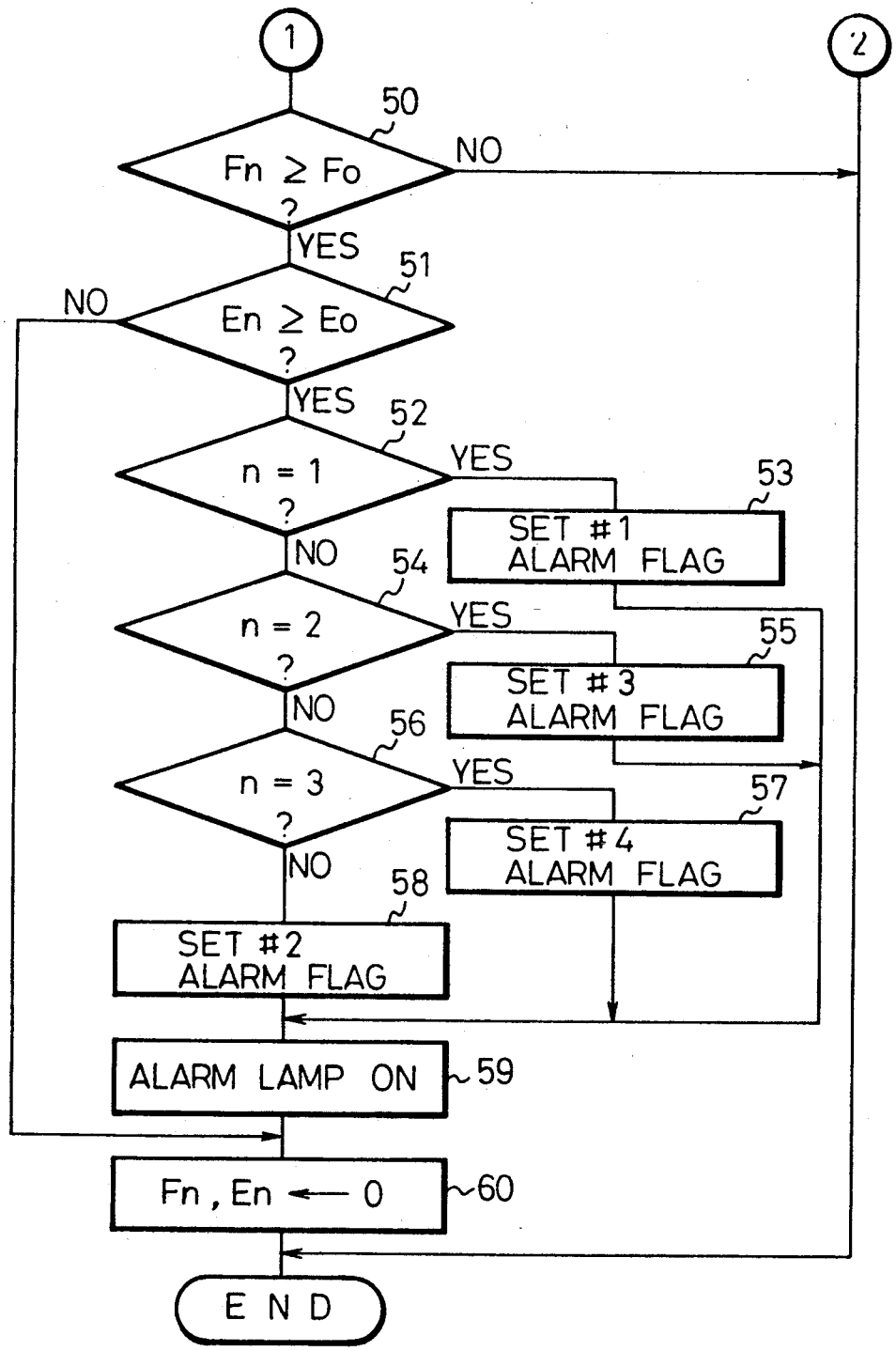

FIGS. 11 and 12 show a flow chart of the process for determining the misfiring cylinder according to the above explained first embodiment of the invention. The routine of FIGS. 11 and 12 is executed by interruptions at every 180 degrees CA.

Referring to FIGS. 11 and 12, at step 40 the counter n (n=0, 1, 2, 3) is incremented by "1", and at step 41, the value of the parameter "Time" (which represents the time when the proceeding interruption was carried out) is stored as "Time 0". Then, at step 42, the current time (i.e. the time when the present interruption is carried out) is stored as "Time". At step 43, the elapsed time $T_n$ (n=1, 2, 3, 4) from the preceding interruption to the present interruption is obtained by calculating the difference between "Time" (the time when the present interruption is carried out) and "Time 0" (when the preceding interruption is carried out). Then, at step 44, it is determined whether or not the engine is being started. If the engine is being started at step 44, the routine is terminated. If the engine is not being started, the routine proceeds to step 45. When the revolution of the engine N is less than 400 rpm at step 44, it is determined that the engine is being started.

At step 45, it is determined whether or not the operating condition of the engine is in the hatched area of FIG. 7. If the operating condition is in said area the routine is terminated, and if not, the routine proceeds to step 46, in which the counter $F_n$ is incremented by "1". That is, the counter $F_n$ is incremented by "1" at every interruption unless the operating condition of the engine is in the hatched area of FIG. 7.

Then, at step 47, the difference $\Delta T_n$ is calculated from the elapsed time $T_n$ calculated at step 43 and the elapsed time $T_{n-1}$ calculated in the preceding interruption. The value $\Delta T_n$ is compared with the setting value K stored in ROM 22 at step 48, and if $\Delta T_n \leq K$, the routine is terminated. If $\Delta T_n > K$, the routine proceeds to step 49, in which the counter $E_n$ is incremented by "1", i.e., the counter $E_n$ is incremented every time $\Delta T_n > K$.

Then, at step 50 it is determined whether or not the value of the counter $F_n$ is larger than or equal to a predetermined constant $F_o$ (e.g., $F_o=10$). If $F_n < F_o$, the routine is terminated, and if $F_n \geq F_o$, the routine proceeds to step 51 in which it is determined whether or not the value of the counter $E_n$ is larger than or equal to a predetermined constant $E_o$ (e.g., $E_o=2$). If $E_n < E_o$, the routine is terminated after resetting the counters $F_n$ and $E_n$ at step 60, and steps 52 to 59 are executed only when $E_n \geq E_o$ at step 51. Namely, steps 52 to 59 are executed only when the determination of whether the $\Delta T_n$ is larger than K is carried out more than $F_o$ times, and when $\Delta T_n > K$ occurs more than $E_o$ times out of $F_n$ times (which is the total number of times of the judgement).

Therefore, if $F_o=10$ and $E_o=2$, steps 52 to 59 are executed only when the frequency of the occurrence of $\Delta T > K$ becomes more than 20%.

At steps 52 to 58, the cylinder number of the engine in which $\Delta T > K$ occurred more times than the above predetermined frequency, is identified from the value of the counter n. Namely, if n=1, it is determined at step 52 that the cylinder #1 is misfiring, and the #1 alarm flag is set at step 53. If n=2, it is determined that the cylinder #3 is misfiring at step 54, and the #3 alarm flag is set at step 55. Similarly, if n=3, it is determined that the cylinder #4 is misfiring at step 56 and the #4 alarm flag is set at step 57, and if n=4, it is determined that the cylinder #2 is misfiring at step 56, and the #2 alarm flag is set at step 58.

Then, at step 59, one of the alarm lamps 33, 34, 35, 36 which corresponds to the alarm flag set at above steps is made ON.

The reason for judging the frequency of the occurrence of $\Delta T > K$ (step 50) in the above embodiment is explained as follows.

When the vehicle is running on a rough road, the road holding condition of the drive wheels changes frequently. If the road holding is worsened, the revolution speed of the engine increases due to slip between the drive wheels and the road surface. Conversely, if the road holding is recovered, the revolution speed of the engine falls due to a firm contact between the drive wheels and the road surface. When the revolution speed of the engine falls, the time T and the difference ΔT thereof also become larger and may cause a misjudgement of the misfire. Nevertheless, the frequency of the occurrence of the increase of the ΔT by the change in the road holding is rather low, and therefore, by judging the frequency of the occurrence of $\Delta T > K$, the effect of the road holding on the determination of misfire can be eliminated. Considering this, the alarm lamps 33, 34, 35, 36 in this embodiment are set so that they are made ON only when the frequency of the occurrence of $\Delta T > K$ becomes larger than 20%.

Figure 13:
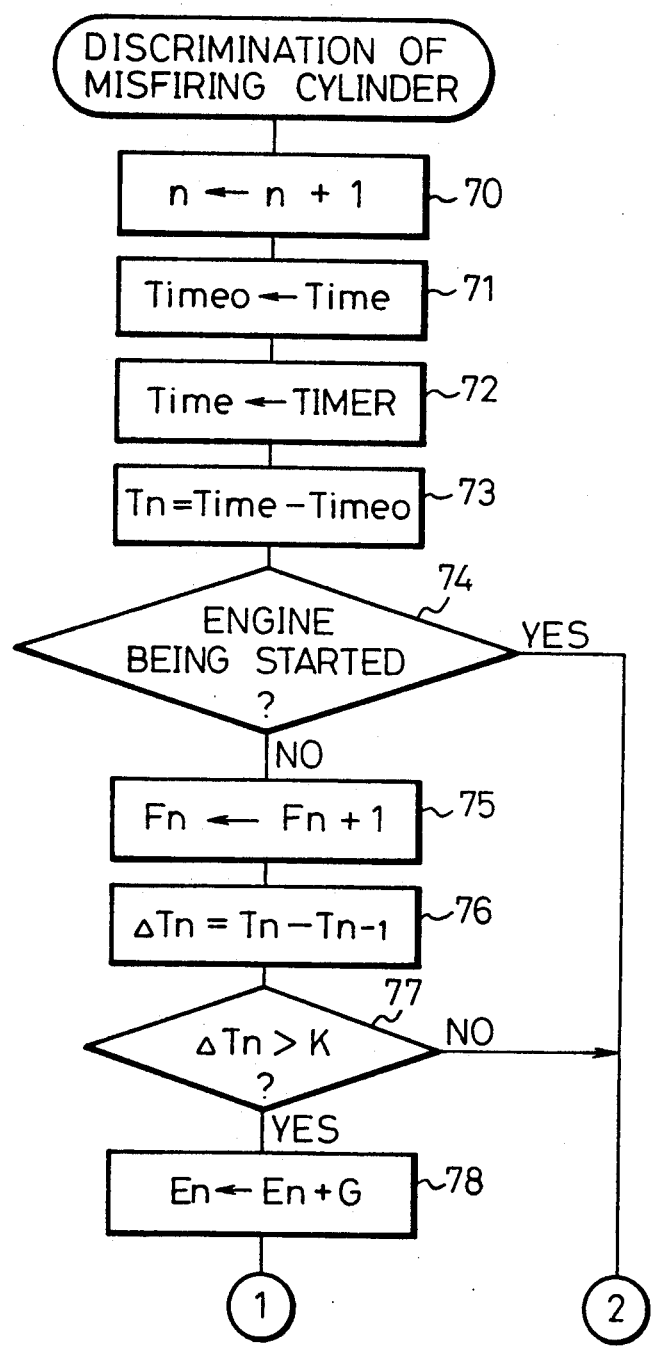
FIGS. 13 and 14 show a flow chart of the misfire determining operation of another embodiment of the present invention.
Figure 14:
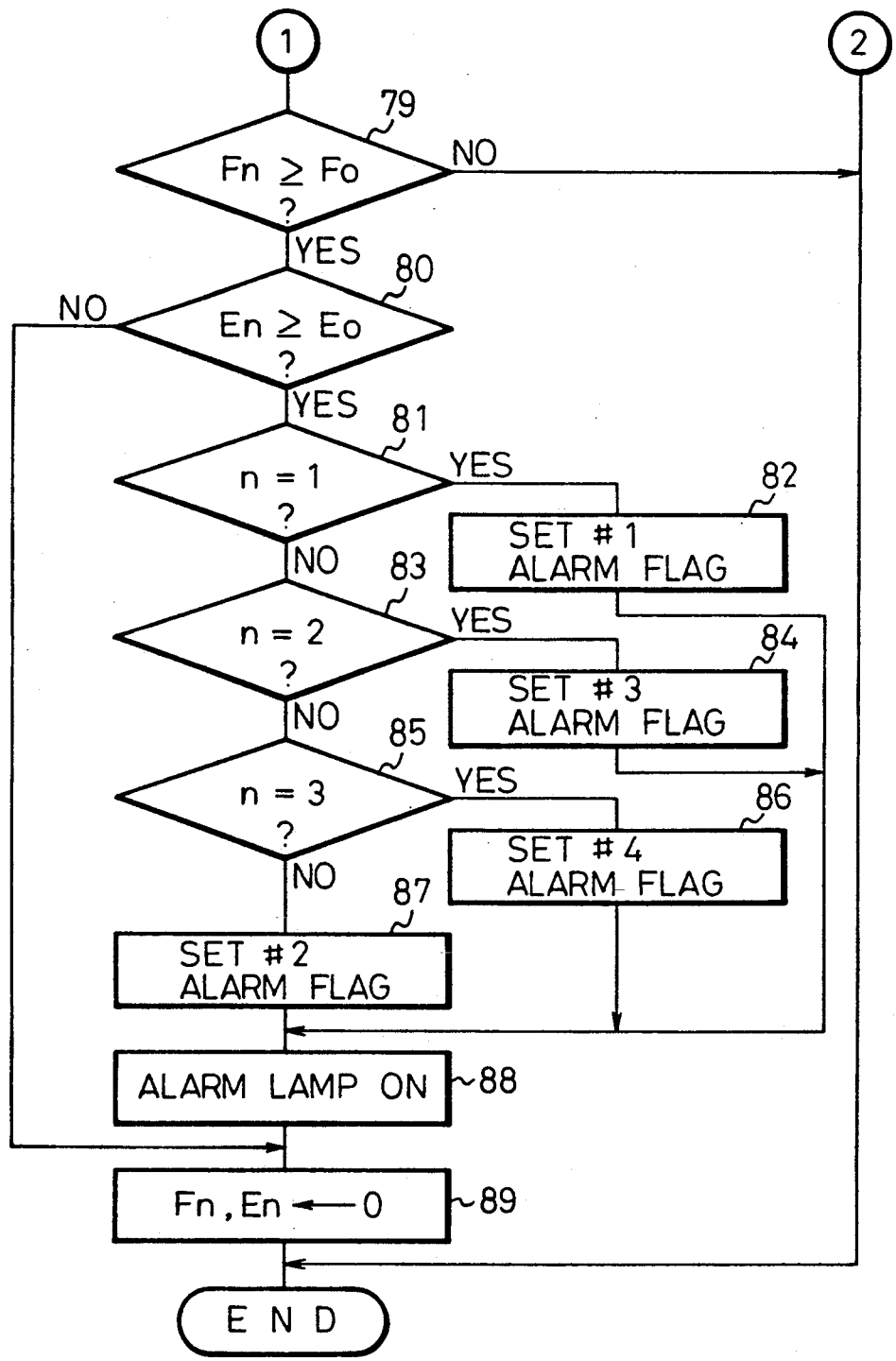

FIGS. 13 and 14 show a flow chart of the process for determining a misfiring cylinder according to the second embodiment of the present invention. The routine of FIGS. 13 and 14 is executed by interruptions of every 180 degrees CA.

When the routine is started in FIG. 13, steps 70 to 73 are carried out for an increment of the counter n (step 70), the renewal of the Time and Time 0 (steps 71, 72), and the calculation of $T_n$ (step 73). Also, at step 74, it is determined whether or not the engine is being started. Since the steps 70 to 74 exactly correspond to the steps 40 to 44 in FIG. 11, a detailed explanation thereof is not repeated here.

Figure 15:
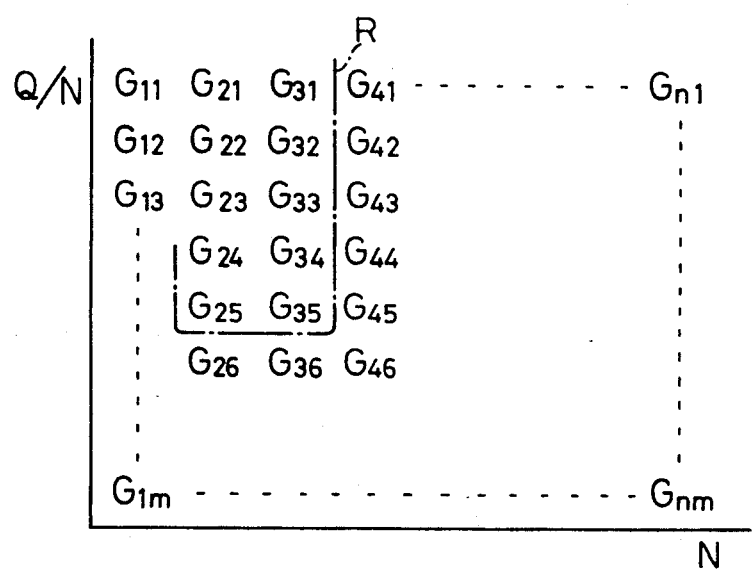
FIG. 15 is a graph showing the set value G.

At step 75 in FIG. 13, the counter $F_n$ is incremented by "1", i.e., in this embodiment the counter $F_n$ is incremented by "1" at every interruption. Then, at step 76, the difference $\Delta T_n$ is calculated by $\Delta T_n = T_n - T_{n-1}$ in the same manner as step 47 in FIG. 11. At step 77, it is determined whether or not the difference $\Delta T_n$ is larger than the set value K. In this embodiment, the set value K is stored in ROM 22 in the form of the map shown in FIG. 8 (C), as a function of the engine operating load (Q/N) and the engine revolution speed N. As explained before the value K is set so that, when the operating condition of the engine is in the area surrounded by the chain line P in FIG. 8 (C), the value K is increased. If $\Delta T_n \leq K$ at step 77, the routine is terminated, and if $\Delta T_n > K$, the routine proceeds to step 78 in which the counter $E_n$ is incremented by "G". The value G is given in the form of a map as shown in FIG. 15, as a function of the engine operating load (Q/N) and the engine speed N. Referring to FIG. 15, the operating area surrounded by the chain line R exactly corresponds to the operating area surrounded by the chain line P in FIG. 8. The value of G in this area, i.e., $G_{21} \sim G_{25}$ and $G_{31} \sim G_{35}$ is set to a lower value such as 0.2, but the value of G outside of this area is set at 1.0. Consequently, when $\Delta T > K$, if the operating condition of the engine is outside of the area surrounded by the chain line R, the counter $E_n$ is increased by 1, and if the operating condition is inside said area, the counter is increased by 0.2. The map for the value G is stored in advance in the ROM 22 of the engine control unit 20.

Then at step 79, it is determined whether or not the value of the counter $F_n$ is larger than or equal to a predetermined constant $F_o$ (e.g., $F_o = 10$). If $F_n < F_o$, the routine is terminated, and if $F_n \geq F_o$, the routine proceeds to step 80 in which it is determined whether or not the value of the counter $E_n$ is larger than or equal to a predetermined constant $E_o$ (e.g., $E_o = 2$). If $E_n < E_o$, the routine is terminated after resetting the counters $F_n$ and $E_n$ at step 89, and steps 81 to 88 are executed only when $E_n \geq E_o$ at step 80. That is, steps 81 to 88 are executed only when the determination of whether the $\Delta T_n$ is larger than K is carried out more than $F_o$ times, and when $\Delta T_n > K$ occurs more than $E_o$ times out of $F_n$ times (which is the total number of the times of the determination).

Therefore, if $F_o = 10$ and $E_o = 2$, steps 81 to 88 are executed only when the frequency of the occurrence of $\Delta T > K$ becomes larger than 20%.

At steps 81 to 87, the cylinder number of the engine in which $\Delta T > K$ occurred at more than the above predetermined frequency, is identified from the value of the counter n. Namely, if $n = 1$, it is determined at step 81 that the cylinder #1 is misfiring, and the #1 alarm flag is set at step 82. If $n = 2$, it is determined that the cylinder #3 is misfiring at step 83, and the #3 alarm flag is set at step 84. Similarly, if $n = 3$, it is determined that the cylinder #4 is misfiring at step 85, and the #4 alarm flag is set at step 86, and if $n = 4$, it is determined that the cylinder #2 is misfiring at step 85, and the #2 alarm flag is set at step 87.

Then, at step 88, one of the alarm lamps 33, 34, 35, 36 which corresponds to the alarm flag set at above steps is made ON.

As mentioned above, by judging the frequency of the occurrence of $\Delta T > K$, the adverse effect of a change in the road holding of the drive wheels on the determination of misfiring cylinder is also eliminated in this embodiment.

Further, when the engine is operated in the area surrounded by the chain line P in FIG. 8, the frequency of the occurrence of $\Delta T > K$ becomes very low, since the value K is largely increased in this area. In addition, even if $\Delta T > K$ occurs in this area, the value of the increment G of the counter $E_n$ is also made small in this area. Therefore, the value of the counter $E_n$ (i.e., the frequency of the occurrence of $\Delta T > K$) is still kept low, and a misjudgement of the misfiring in this operating area due to an increased vibration of the engine can be avoided.

As explained above, according to the present invention, a misjudgement of the misfiring caused by the engine vibration can be completely prevented.

Although the invention has been described by reference to specific embodiments chosen for purposes of illustration, it should be apparent that numerous modifications could be made thereto by those skilled in the art without departing from the basic concept and scope of the invention.

We claim:

1. A device for determining a misfire of a cylinder of a multicylinder engine having a crankshaft rotatably supported by the engine body, said device comprising:
   a velocity detecting means for detecting an angular velocity of the crankshaft rotation relative to the engine body in power stroke periods of respective cylinders;
   a difference calculating means for calculating differences of said angular velocities in the power stroke periods of two respective cylinders;
   a misfire determining means for determining that a misfire has occurred when said difference of the angular velocities becomes larger than a predetermined set value;
   an operating condition detecting means for detecting operating conditions of the engine, wherein said operating condition detecting means detects a revolution speed of the engine and an operating load of the engine; and
   a control means for controlling operation of said misfire detecting means when the engine operating conditions coincide with a predetermined condition in which the vibration of the engine is increased, wherein said predetermined condition in which the vibration of the engine is increased is defined as a function of the revolution speed and the operating load of the engine, and wherein said control means prohibits said misfire determining means from carrying out said determining operation of a misfire when the engine operating condition coincides with said predetermined condition.

2. A device for determining a misfire of a cylinder of a multicylinder engine having a crankshaft rotatably supported by the engine body, said device comprising:
   a velocity detecting means for detecting an angular velocity of the crankshaft rotation relative to the engine body in power stroke periods of respective cylinders;
   a difference calculating means for calculating differences of said angular velocities in the power stroke periods of two respective cylinders;
   a misfire determining means for determining that a misfire has occurred when said difference of the angular velocities becomes larger than a predetermined set value;
   an operating condition detecting means for detecting operating conditions of the engine, wherein said operating condition detecting means detects a revolution speed of the engine and an operating load of the engine; and
   a control means for controlling operation of said misfire detecting means when the engine operating conditions coincide with a predetermined condition in which the vibration of the engine is increased, wherein said predetermined condition in which the vibration of the engine is increased is defined as a function of the revolution speed and the operating load of the engine, and wherein said control means controls said misfire detecting means so that said predetermined set value of the difference of the angular velocities is increased by a predetermined amount when the engine operating condition coincides with said predetermined condition.

3. A device as set forth in claim 2, further comprising an alarm means for generating an alarm signal indicating the cylinder number when the frequency at which said misfire determining means determines that a misfire has occurred in said cylinder is larger than a predetermined frequency value.

* * * * *